(12) United States Patent  (10) Patent No.: US 11,873,040 B2
John et al.  (45) Date of Patent: Jan. 16, 2024

(54) METHOD FOR MONITORING A STEERING SYSTEM

(71) Applicant: Robert Bosch GmbH, Stuttgart (DE)

(72) Inventors: Andreas John, Aalen (DE); Michael Friedel, Ruppertshofen (DE); Stefan Kersten Weber, Modena (IT); Susanne Meyer, Schorndorf (DE)

(73) Assignee: Robert Bosch GmbH, Stuttgart (DE)

( * ) Notice: Subject to any disclaimer, the term of this patent is extended or adjusted under 35 U.S.C. 154(b) by 220 days.

(21) Appl. No.: 17/436,907

(22) PCT Filed: Feb. 10, 2020

(86) PCT No.: PCT/EP2020/053260
§ 371 (c)(1),
(2) Date: Sep. 7, 2021

(87) PCT Pub. No.: WO2020/187485
PCT Pub. Date: Sep. 24, 2020

(65) Prior Publication Data
US 2022/0135121 A1  May 5, 2022

(30) Foreign Application Priority Data
Mar. 15, 2019 (DE) ..................... 10 2019 203 522.1

(51) Int. Cl.
B62D 5/04 (2006.01)
B62D 6/00 (2006.01)
(Continued)

(52) U.S. Cl.
CPC ........... B62D 5/0481 (2013.01); B62D 6/008 (2013.01)

(58) Field of Classification Search
None
See application file for complete search history.

(56) References Cited

U.S. PATENT DOCUMENTS

2003/0079934 A1  5/2003 Kanda et al.
2018/0111553 A1*  4/2018 Kubota .................. G06V 20/56
(Continued)

FOREIGN PATENT DOCUMENTS

CN  109214078 A  *  1/2019  ............. G06F 30/15
DE  10 2004 017 660 A1  10/2005
(Continued)

OTHER PUBLICATIONS

DE 102009002706 A1 description translated by espacenet on Jun. 14, 2023. (Year: 2010).*
(Continued)

Primary Examiner — Adam D Tissot
Assistant Examiner — Laura E Linhardt
(74) Attorney, Agent, or Firm — Maginot, Moore & Beck LLP

(57) ABSTRACT

The disclosure relates to a method for monitoring a steering system, in particular during an operation in a vehicle, in which method a load characteristic of at least one steering component of the steering system is determined and is evaluated in order to determine a stress and/or a state of the steering component. According to the disclosure, the load characteristic comprises at least one load on the steering component caused by an external application of force.

11 Claims, 2 Drawing Sheets

(51) Int. Cl.
*B62D 6/02* (2006.01)
*B60R 1/00* (2022.01)
*B60R 11/02* (2006.01)
*B60R 11/04* (2006.01)

(56) References Cited

U.S. PATENT DOCUMENTS

2019/0031231 A1    1/2019  George
2020/0130727 A1*  4/2020  Kim .................... B62D 15/025

FOREIGN PATENT DOCUMENTS

DE      10 2009 002 706 A1    11/2010
DE        102009002706 A1 *  11/2010  ............. B62D 6/008
WO        2018/163791 A1    9/2018

OTHER PUBLICATIONS

CN 109214078 A description translated by espacenet on Jun. 14, 2023. (Year: 2019).*
CN 109214078 A claims translated by espacenet on Jun. 14, 2023. (Year: 2019).*

* cited by examiner

METHOD FOR MONITORING A STEERING SYSTEM

This application is a 35 U.S.C. § 371 National Stage Application of PCT/EP2020/053260, filed on Feb. 10, 2020, which claims the benefit of priority to Serial No. DE 10 2019 203 522.1, filed on Mar. 15, 2019 in Germany, the disclosures of which are incorporated herein by reference in their entirety.

BACKGROUND

The disclosure proceeds from a method for monitoring a steering system. The disclosure relates additionally to a control device having a computing unit for carrying out such a method, and to a vehicle having such a control device.

A method for monitoring an electrical and/or electromechanical system, such as, for example, a steering system, is known from DE 10 2004 017 660 A1, in which method a load characteristic in the form of an internal or system-specific load of a component is determined and evaluated in order to determine a stress and/or a state of the component. Further system parameters, such as, for example, an operating time, a time under load and/or an ambient temperature, can additionally be taken into account in the evaluation. However, external loads, which likewise have a significant influence on the stress and/or the state of the component and which are caused, for example, by unevenness of the road, potholes and/or other incidents or exceptional incidents, are not taken into account.

Proceeding therefrom, the object of the disclosure consists in particular in providing a method for monitoring a steering system which has improved properties in respect of a stress analysis. The object is achieved by the features of claims 1, 10 and 11, while advantageous embodiments and further developments of the disclosure can be found in the dependent claims.

SUMMARY

The disclosure proceeds from a method for monitoring a steering system, in particular during operation in a vehicle and advantageously in a motor vehicle, in which a load characteristic of at least one steering component of the steering system, in particular a steering component that is to be monitored, is determined and evaluated in order to determine a stress, in particular a mechanical and/or electrical stress, and/or a state of the steering component.

It is proposed that the load characteristic includes at least a load, in particular an external load, on the steering component that is caused by an externally applied force and in particular acts on the steering component from a surrounding area. The externally applied force, which in particular leads to a load on the steering component, can be caused, for example, by unevenness of the road, by a pothole, by hitting an obstacle, by steering into an obstacle, by driving over an obstacle and/or by other such incidents or exceptional incidents. By means of this embodiment, in particular an advantageous stress analysis of the steering component and/or of the steering system can be achieved. In particular, mechanisms of damage by external loads, which can differ significantly from mechanisms of damage by internal and/or system-specific loads, can also reliably be detected and taken into account, whereby the operational reliability can advantageously be increased.

The vehicle and/or the steering system can additionally comprise further components and/or assembly groups, such as, for example, at least one control device, at least one recording unit for recording the load characteristic, a steering handle for applying a manual torque, a steering transmission, which advantageously has at least one steering control element, for example in the form of a steering rack, at least one steering actuator, which in particular cooperates with the steering transmission, and/or at least one coupling transmission for coupling the steering actuator with the steering transmission. In particular, the steering actuator and/or a component of the vehicle and/or of the steering system that is operatively connected to the steering actuator, such as, for example, the steering control element and/or the coupling transmission, can be the steering component that is to be monitored. A "steering actuator" is to be understood as being in particular an actuator unit, in particular an electrical actuator unit, which is provided in particular for transmitting a steering torque to the steering control element and thus advantageously influencing a direction of travel of the vehicle. The steering actuator is preferably provided for supplying a steering torque for amplifying a manual torque applied to the steering handle and/or a steering torque for automatically and/or autonomously controlling a direction of travel of the vehicle. For this purpose, the steering actuator can comprise at least one electric motor. The electric motor is advantageously in the form of a brushless motor and preferably in the form of an asynchronous motor or in the form of a permanently excited synchronous motor. "Provided" is to be understood in particular as meaning specially programmed, designed and/or equipped. That an object is provided for a specific function is to be understood in particular as meaning that the object fulfils and/or performs that specific function in at least one use and/or operating state.

Furthermore, a "load characteristic" is to be understood in particular as being a characteristic which is correlated at least with a load on the steering component that is caused in particular by an internally and/or externally applied force on the steering component. In particular, at least on the basis of the load characteristic, a stress, in particular a mechanical and/or electrical stress, and/or a state of the steering component can be inferred and/or a stress, in particular a mechanical and/or electrical stress, and/or a state of the steering component can be determined. The load characteristic can advantageously further include further loads on the steering component, such as, for example, a load caused by an ambient temperature, a load caused by atmospheric humidity and/or other loads caused by ambient conditions. Furthermore, there can advantageously additionally be inferred on the basis of the load characteristic a stress, in particular a mechanical and/or electrical stress, and/or a state of at least one vehicle component of the vehicle and/or a stress, in particular a mechanical and/or electrical stress, and/or a state of at least one vehicle component of the vehicle. Advantageously, the load characteristic is monitored during an entire monitoring period and a change of the load characteristic over time is evaluated in order to determine the stress and/or the state of the steering component. A "monitoring period" is to be understood in particular as being a period of time, which in particular is of long duration and advantageously correlated with a working life of the steering system and/or of the vehicle, in which changes of the load characteristic are recorded. In particular, the monitoring period can comprise a period of several days, several weeks, several months and/or several years.

The vehicle and/or the steering system in the present case can further comprise in particular at least one computing unit and/or at least one control device having a computing unit, wherein the computing unit is provided in particular for carrying out the method for monitoring the steering device. A "computing unit" is to be understood in particular as being an electrical and/or electronic unit which has an information input, information processing and an information output. Advantageously, the computing unit further has at least one processor, at least one operating memory, at least one input and/or output means, at least one operating program, at least one control routine, at least one calculation routine, at least one monitoring routine and/or at least one evaluation routine. In particular, the computing unit is provided at least for determining and/or receiving the load characteristic of the steering component and in particular for determining a stress, in particular a mechanical and/or electrical stress, and/or a state of the steering component.

In order to determine the load caused by the externally applied force, the vehicle and/or the steering system can comprise in particular a special sensor, such as, for example, an acceleration sensor and/or a structure-borne noise sensor. Alternatively or in addition, however, it is proposed that, in order to determine the load caused by the externally applied force, at least an acceleration, in particular caused by the externally applied force, of an electrical steering actuator of the steering system, in particular of the steering actuator already mentioned above and advantageously of a rotor element of the steering actuator, and/or an operating parameter correlated with the acceleration, such as, for example, an operating voltage and/or an operating current, of the steering actuator is monitored and in particular evaluated. In particular a particularly simple and/or inexpensive determination of the external load can thereby be achieved.

It is additionally proposed that, in order to determine the load caused by the externally applied force, at least an inertia and advantageously a moment of inertia of an electrical steering actuator of the steering system, in particular of the steering actuator already mentioned above and advantageously of the rotor element of the steering actuator, is taken into account. In particular a particularly precise determination of the external load can thereby be achieved.

In a further embodiment it is proposed that the load characteristic includes at least one internal and/or system-specific load on the steering component, in particular a load generated and acting on the steering component during operation of the steering system, whereby in particular a comprehensive stress analysis of the steering component and/or of the steering system can be achieved. In particular, mechanisms of damage of internal and/or system-specific loads can thereby also be recorded and taken into account, whereby the operational reliability can advantageously further be increased. Moreover, a maintenance interval of the vehicle can thereby advantageously also be identified and defined. Furthermore, a remaining working life of the steering component and/or of the vehicle can advantageously be predicted and/or estimated on the basis of the load characteristic.

In order to determine the internal and/or system-specific load, the vehicle and/or the steering system can comprise in particular a special further sensor, such as, for example, a temperature sensor, a magnetic field sensor, a humidity sensor, a voltage sensor and/or a current sensor, whereby there can be recorded, for example, an excess voltage, voltage peaks, an increased current and/or current peaks, for example in an on-board electrical system of the vehicle, and loads of the steering component correlated therewith can be taken into account. Alternatively or in addition, however, it is proposed that, in order to determine the internal and/or system-specific load, at least a drive torque and/or a driving power of an electrical steering actuator of the steering system, in particular of the steering actuator already mentioned above and advantageously of the rotor element of the steering actuator, and/or a further operating parameter correlated with the drive torque and/or the driving power, such as, for example, a further operating voltage and/or a further operating current, of the steering actuator is monitored and in particular evaluated. In particular a particularly simple and/or inexpensive determination of the internal and/or system-specific load can thereby be achieved.

A particularly simple evaluation algorithm for the stress analysis, which at the same time allows a remaining working life of the steering component to be determined, can in particular be provided if the load characteristic is evaluated using a rainflow counting method and/or a min/max counting method, advantageously in combination with a Wöhler diagram, a Haigh diagram and/or Miner's rule. The rainflow counting method is preferably used in particular for the internal and/or system-specific load and in particular for data reduction of measured data correlated with the internal and/or system-specific load.

Moreover, the min/max counting method is preferably used for the external load and in particular for data reduction of measured data correlated with the external load. The min/max counting method records in particular the reversal points and/or maximum values and minimum values in the corresponding measured data. The Wöhler diagram, the Haigh diagram and/or Miner's rule is used in a subsequent process step advantageously for the actual damage calculation.

It is further proposed that at least one state characteristic correlated with a subsurface of the vehicle is determined using the load characteristic. In particular, a state of the subsurface and advantageously of a road can be inferred and/or a state of the subsurface and advantageously of the road can be determined at least on the basis of the state characteristic. In particular, the data recorded for the stress analysis can thereby advantageously be linked with a subsurface over which the vehicle is currently travelling.

It is additionally proposed that the state characteristic is used to generate a message, in particular a message correlated with the subsurface of the vehicle, for example for warning a driver, and/or, advantageously together with recorded location data, for example of a navigation system, to generate a road state map. In particular a particularly high degree of flexibility and/or operational reliability can thereby be achieved. A driver can thereby be warned, for example, when he is leaving a safe road. Moreover, the road state map can advantageously be used in future journeys for warning the driver in good time of unevenness of the road and/or potholes or the like. In particular, it is also conceivable in this context to transmit the state characteristic, advantageously wirelessly, to other vehicles and/or to receive further state characteristics, advantageously wirelessly, from other vehicles, whereby in particular an advantageous exchange of the state characteristics between different vehicles can be achieved and/or generation of a road state map can be simplified.

It is further proposed that a current driving mode is determined, in particular from a group of different driving modes including at least a conventional and/or manual driving mode and an autonomous and/or semi-autonomous driving mode, and, in at least an operating state in which the current driving mode is an autonomous and/or semi-autonomous driving mode, an action for leaving the autonomous and/or semi-autonomous driving mode is triggered and/or performed in dependence on the load characteristic and in particular in dependence on the state characteristic. Particularly high operational reliability, in particular in the case of a vehicle with an autonomous and/or semi-autonomous driving mode, can thereby be achieved in particular.

The method for monitoring the steering system, the control device and the vehicle are not intended to be limited to the application and embodiment described above. In particular, in order to fulfil an operating principle described herein, the method for monitoring the steering system, the control device and the vehicle can have a number of individual elements, components and units that differs from a number mentioned herein.

BRIEF DESCRIPTION OF THE DRAWINGS

Further advantages will become apparent from the following description of the drawings. In the drawings, an exemplary embodiment of the disclosure is shown. The drawings, and the description contain numerous aspects of the disclosure. The person skilled in the art will advantageously also consider these aspects individually and combine them to form expedient further combinations.

In the drawings.

DETAILED DESCRIPTION

Figure 1A:
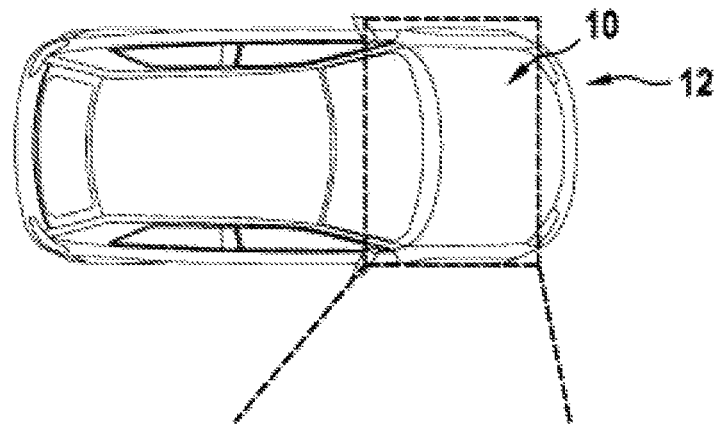
FIG. 1a-b show, in a simplified representation, an example of a vehicle with a steering system.
Figure 1B:
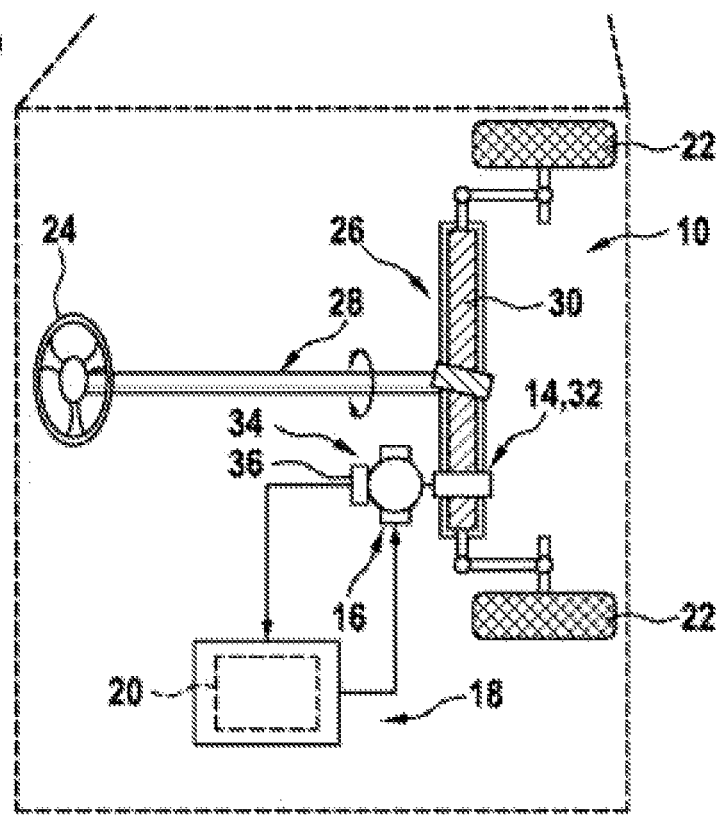

FIGS. 1a and 1b show, in a simplified representation, a vehicle 12, which by way of example is in the form of a passenger car, having multiple vehicle wheels 22 and having a steering system 10. The steering system 10 is operatively connected to the vehicle wheels 22, which in the present case are in particular in the form of front wheels, and is provided for influencing a direction of travel of the vehicle 12. The steering system 10 is further in the form of an electrically assisted steering system and accordingly has electrical power assistance in the form of servo steering. The vehicle 12 in the present case additionally comprises by way of example at least two different driving modes, in particular a conventional and/or manual driving mode and an autonomous and/or semi-autonomous driving mode. In principle, however, it is also conceivable to configure a steering system as a hydraulically assisted steering system, in particular with hydraulic power assistance. Furthermore, a steering system could in principle also be in the form of a steer-by-wire system and/or in the form of a steering system of a commercial vehicle. Moreover, a vehicle could have exactly one driving mode and/or be in the form of a commercial vehicle.

The steering system 10 comprises a steering handle 24, which in the present case is in the form of a steering wheel by way of example, for application of a manual torque, a steering transmission 26, which is in the form of a rack-and-pinion steering transmission by way of example and comprises a steering control element 30 and which is provided for converting a steering input at the steering handle 24 into a steering movement of the vehicle wheels 22, and a steering shaft 28 for connecting, in particular mechanically, the steering handle 24 to the steering transmission 26. Alternatively, a steering handle could also be in the form of a steering lever and/or steering ball or the like. A steering system could also in principle be free of a steering handle, for example in the case of a vehicle that is driven purely autonomously. Moreover, a steering shaft could also connect a steering handle to a steering transmission only intermittently, such as, for example, in the case of a vehicle with a steer-by-wire steering system with a mechanical fallback level. In this context it is of course also conceivable to dispense with a steering shaft completely.

The steering system 10 additionally comprises a steering actuator 16. The steering actuator 16 is electrical and/or electronic at least in part. The steering actuator 16 is operatively connected to the steering transmission 26. The steering actuator 16 is provided for supplying a steering torque for amplifying a manual torque applied to the steering handle 24 and for transmitting it to the steering control element 30. For this purpose, the steering actuator 16 comprises at least one electric motor. The electric motor is in the present case in particular in the form of a permanently excited synchronous motor and is provided for generating the steering torque.

For coupling the steering actuator 16 with the steering transmission 26, the steering system 10 further comprises a coupling transmission 32. The coupling transmission 32 can be in the form of, for example, a belt transmission, a helical transmission or a ball screw. The coupling transmission 32 is provided for transmitting a steering torque of the electric motor to the steering control element 30 in order to effect an adjustment of the steering control element 30. In principle, however, it is also conceivable to dispense with a coupling transmission and to couple an electric motor directly with a steering control element. Moreover, an electric motor could also be dispensed with completely, such as, for example, in the case of a hydraulically assisted steering system.

In addition, the vehicle 12 comprises at least one recording unit 34. The recording unit 34 is provided for recording a load characteristic of at least one steering component 14, such as, for example, of the steering actuator 16, of the steering control element 30 and/or of the coupling transmission 32. For this purpose, the recording unit 34 comprises at least one sensor 36 associated with the steering actuator 16. The sensor 36 is in the present case in the form of a rotor position sensor and is provided for recording at least one rotor position signal of the electric motor. Alternatively or in addition, a recording unit could, however, also comprise at least one sensor other than a rotor position sensor, such as, for example, an acceleration sensor, a structure-borne noise sensor, a voltage sensor, a current sensor and/or a temperature sensor.

The vehicle 12 further has a control device 18. By way of example, the control device 18 is in the form of a steering control device and consequently is part of the steering system 10. The control device 18 is operatively connected to the steering actuator 16 and the recording unit 34. The control device 18 is provided for receiving the load characteristic from the recording unit 34. The control device 18 is additionally provided for controlling the steering actuator 16.

For this purpose, the control device 18 comprises a computing unit 20. The computing unit 20 comprises at least one processor, for example in the form of a microprocessor, and at least one operating memory. The computing unit 20 additionally comprises at least one operating program, stored in the operating memory, having at least one monitoring routine 38, at least one calculation routine, in the present case in particular a damage calculation routine 40, 44, and at least one evaluation routine 50. In principle, however, it is also conceivable to configure a control device separately from a steering system. In this case, a vehicle could have, for example, a single central control device with a central computing unit. It is further conceivable to configure a computing unit separately from a vehicle. In this case, a computing unit could, for example, be part of an external, in particular central, computing system, for example part of a server network and/or cloud network.

In order to improve the analysis of a stress and/or of a state of the steering system 10, or at least of a steering component 14 of the steering system 10, a method for monitoring the steering system 10 is proposed in the present case. In the present case, the steering component corresponds by way of example to the coupling transmission 32 or to at least part of the coupling transmission 32. Alternatively or in addition, a steering component to be monitored could, however, also be a steering actuator or another component that is operatively connected to a steering actuator, such as, for example, a steering control element. Moreover, it is conceivable additionally to monitor and analyze further vehicle components of the vehicle.

The computing unit 20 is further provided in particular for carrying out the method and has for this purpose in particular a computer program with corresponding program code means.

According to the disclosure, a load characteristic of the steering component 14 to be monitored is determined, in particular by means of the recording unit 34, and evaluated in order to determine a mechanical and/or electrical stress and/or a state of the steering component 14. In the present case, the load characteristic is monitored during an entire monitoring period, advantageously during an entire operating time and/or working life of the steering system 10 and/or of the vehicle 12, and a change of the load characteristic over time is evaluated in order to determine the stress and/or the state of the steering component 14.

In the present case, the load characteristic includes at least one external load on the steering component 14 which is caused by an externally applied force and in particular acts on the steering component 14 from a surrounding area. The externally applied force, which in particular leads to the load on the steering component 14, can be caused, for example, by unevenness of the road, by a pothole, by hitting an obstacle, by steering into an obstacle, by driving over an obstacle and/or by other such incidents or exceptional incidents. In order to determine the load caused by the externally applied force, at least an acceleration of the steering actuator 16 caused by the externally applied force and recorded by means of the sensor 36 is monitored and evaluated. In addition, in order to determine the load caused by the externally applied force, at least an inertia of the steering actuator 16 is taken into account.

In order further to achieve a comprehensive stress analysis of the steering component 14 and/or of the steering system 10, the load characteristic further includes an internal and/or system-specific load on the steering component 14, in particular a load generated and acting on the steering component 14 during operation of the steering system 10. The internal and/or system-specific load is caused by normal operation of the steering system 10. In order to determine the internal and/or system-specific load, a drive torque and/or a driving power of the steering actuator 16 is monitored and evaluated in the present case.

Furthermore, the load characteristic can in principle also include further loads on the steering component 14, such as, for example, a load on the steering component 14 caused by an ambient temperature, a load on the steering component 14 caused by atmospheric humidity, and/or a load on the steering component 14 caused by an excess voltage and/or voltage peaks, for example in an on-board electrical system, or other such loads.

The load characteristic of the steering component 14, or the total load thereon, is then obtained as the difference between the external load and the internal load. The following applies:

$$M = M_{ext} - M_{int} = [(J \cdot \ddot{\alpha}) - M_{el}] \cdot i \cdot \eta_{System} \quad (1)$$

wherein $M_{ext}$ denotes the external load, $M_{int}$ denotes the internal and/or system-specific load, J denotes the inertia of the steering actuator 16, $\ddot{\alpha}$ denotes the acceleration, in particular rotor acceleration, of the steering actuator 16, $M_{el}$ denotes the drive torque and/or the driving power of the steering actuator 16, i denotes a transmission ratio of the coupling transmission 32 and $\eta_{System}$ denotes a coefficient of the external and internal and/or system-specific load.

The load characteristic of the steering component 14, or the total load thereon, is thus composed in the present case at least of the external load and the internal and/or system-specific load on the steering component 14, wherein a situation in which the external load is greater than the internal and/or system-specific load indicates an external incident or exceptional incident, for example in the form of a pothole, hitting an obstacle, etc. In principle, however, it is also conceivable to dispense with the recording and/or evaluation of an internal and/or system-specific load on a steering component and to map such internal and/or system-specific loads by means of previously applied characteristic curves, for example.

In order to evaluate the load characteristic, the load characteristic could be logged, stored and/or classified or compared with a maximum value. Advantageously, the load characteristic can also be evaluated using a rainflow counting method and/or a min/max counting method, for example in combination with a special damage calculation algorithm, in particular a Wöhler diagram, a Haigh diagram and/or Miner's rule, whereby in particular an advantageously simple determination of a remaining working life of the steering component 14 can be achieved. Such damage calculation algorithms are known per se and will therefore not be described in greater detail hereinbelow.

On the basis of the load characteristic, field loads and/or maintenance intervals of the vehicle 12 can then be identified and/or system responses can be triggered, such as, for example, the generation of a message to warn the driver, switching off of the steering system 10 and/or a degradation of the steering system 10. In addition, individual steering components and/or vehicle components could also be recycled and/or overhauled using the load characteristic, for example by means of remanufacturing. In this context, it is conceivable to reuse steering components and/or vehicle components which have been loaded to a lesser degree during a lifetime of a corresponding vehicle and/or steering system. Furthermore, belt slipping and/or belt jumping or the like, for example, could also be determined on the basis of the load characteristic.

Figure 2:
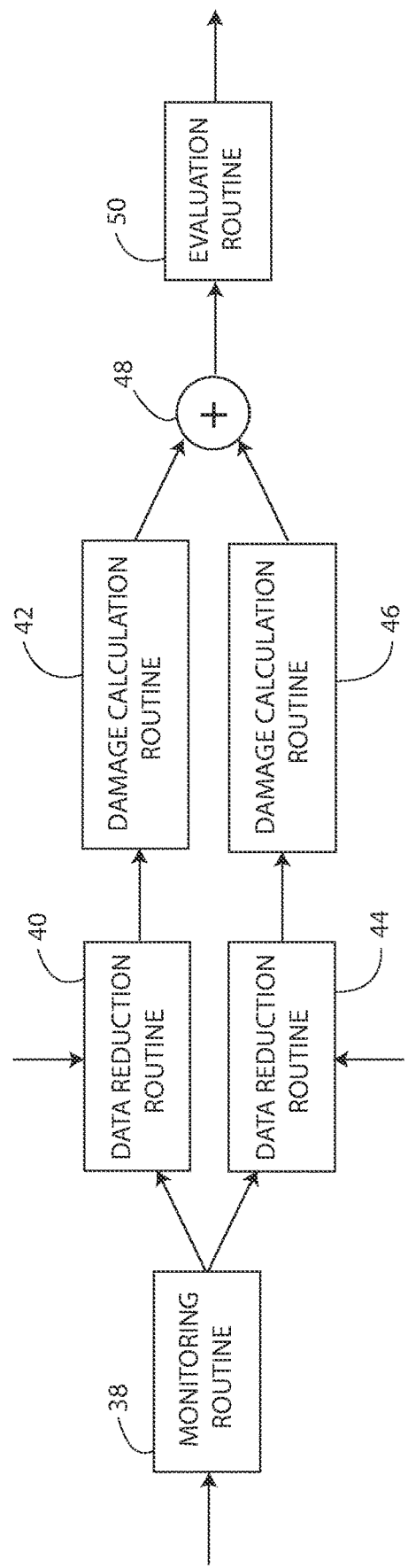
FIG. 2 shows a schematic representation of a signal flow diagram for monitoring the steering system.

FIG. 2 shows a schematic representation of a signal flow diagram for monitoring the steering system 10 and in particular for evaluating the load characteristic.

The computing unit 20 is provided for monitoring, analyzing and classifying the load characteristic by means of the monitoring routine 38. In the present case, the computing unit 20 is provided at least for determining, by means of the monitoring routine 38, whether the external load or the internal and/or system-specific load is the dominant load.

If the external load is the dominant load, the computing unit 20 is provided for further processing the load characteristic by means of the first data reduction routine 40, in the present case in particular a min/max counting method, and then, by means of a first damage calculation routine 42, for example using a Wöhler diagram, for determining an external degree of damage of the steering component 14 caused by the externally applied force. In particular, further influencing parameters, such as, for example, a current temperature, can be supplied to the first data reduction routine 40 and/or to the first damage calculation routine 42, so that they can be taken into account in the evaluation of the load characteristic.

If, on the other hand, the internal and/or system-specific load is the dominant load, the computing unit 20 is provided for further processing the load characteristic by means of the second data reduction routine 44, which is different from the first data reduction routine 40, in the present case in particular a rainflow counting method, and then, by means of a second damage calculation routine 46, for example using a further Wöhler diagram, for determining an internal degree of damage of the steering component 14 caused by normal operation of the steering system 10. The damage calculation routines 42, 46 can differ in the present case, for example, on the basis of the Wöhler diagrams used. Furthermore, further influencing parameters, such as, for example, a current temperature, can also be supplied to the second data reduction routine 44 and/or to the second damage calculation routine 46, so that they can be taken into account in the evaluation of the load characteristic.

The computing unit 20 is then provided for combining the external degree of damage and the internal degree of damage, by means of a summation routine 48, to form a total degree of damage of the steering component 14, in order to determine the stress and/or the state of the steering component 14. It can thereby be provided in particular for multiplying the external degree of damage and/or the internal degree of damage by a weighting factor and thereby weighting the external degree of damage and the internal degree of damage differently.

Thereafter, the computing unit 20 is provided for evaluating the total degree of damage of the steering component 14 by means of the evaluation routine 50, for example by means of a comparison with a limit value, and, if the limit value is exceeded, for initiating a corresponding response, such as, for example, the generation of a message.

By means of this embodiment, both mechanisms of damage of internal and/or system-specific loads and mechanisms of damage of external loads, which can differ significantly from mechanisms of damage of internal and/or system-specific loads, can reliably be detected and taken into account.

In addition, it can be provided that, using the load characteristic, at least one state characteristic correlated with a subsurface of the vehicle 12 is determined, whereby in particular the data recorded for the stress analysis can additionally be linked to a subsurface over which the vehicle is currently travelling. In this context it is conceivable, for example, to use the state characteristic to generate a message, in particular a message correlated with the subsurface of the vehicle 12, for example for warning a driver, and/or, advantageously together with recorded location data, to generate a road state map. A driver can thereby be warned, for example, when he is leaving a safe road. Moreover, the road state map can advantageously be used in future journeys to warn the driver in good time of unevenness of the road and/or of potholes or the like. Moreover, a current driving mode of the vehicle 12 can also be determined and, in at least an operating state in which the current driving mode is an autonomous and/or semi-autonomous driving mode, an action for leaving the autonomous and/or semi-autonomous driving mode can be triggered and/or performed in dependence on the load characteristic and/or in dependence on the state characteristic. By means of such further developments, operational reliability in particular can be increased further.

The invention claimed is:

1. A method for monitoring a steering system in a vehicle during operation, comprising:
    determining a load characteristic of at least one steering component of the steering system;
    performing a stress analysis of the steering component by evaluating the determined load characteristic, wherein:
        the load characteristic includes at least a load on the steering component caused by an externally applied force, and
        at least a rotor acceleration of a rotor of an electrical steering actuator of the steering system is monitored to determine the load caused by the externally applied force the rotor acceleration caused by the externally applied force; and
    determining damage to the steering component based on the performed stress analysis in response to the externally applied force.

2. The method as claimed in claim 1, wherein at least an inertia of an electrical steering actuator of the steering system is taken into account in determining the load caused by the externally applied force.

3. The method as claimed in claim 1, wherein the load characteristic includes at least one system-specific load on the steering component, and the at least one system-specific load includes a load generated and acting on the steering component during operation of the steering system.

4. The method as claimed in claim 3, wherein at least one of a drive torque and a driving power of an electrical steering actuator of the steering system is monitored to determine the at least one system-specific load.

5. The method as claimed in claim 1, wherein at least one of a rainflow counting method and a min/max counting method is used to evaluate the determined load characteristic.

6. The method as claimed in claim 1, wherein at least one state characteristic correlated with a subsurface of the vehicle is determined using the load characteristic.

7. The method as claimed in claim 6, further comprising at least one of:
    generating a message using the at least one state characteristic; and
    generating a road state map using the at least one state characteristic.

8. The method as claimed in claim 1, further comprising:
    determining a current driving mode; and
    triggering an action to leave an operating state in which the current driving mode is at least one of an autonomous operating state, and a semi-autonomous driving mode operating state, based upon the determined load characteristic.

9. A control device having a computing unit configured to carry out a method as claimed in claim 1.

10. A vehicle having at least one steering system which comprises at least one steering component, and having a control device as claimed in claim 9.

11. The method as claimed in claim 1, wherein determining the damage includes determining a remaining working life of the steering component.

* * * * *